Patented Mar. 11, 1924.

1,486,647

UNITED STATES PATENT OFFICE.

CARLETON ELLIS, OF MONTCLAIR, NEW JERSEY, AND MORTIMER J. COHEN, OF NEW YORK, N. Y.; GEORGE COHEN, ADOLPH BRESLAUER, AND HERMAN ASHER EXECUTORS OF SAID MORTIMER J. COHEN, DECEASED; SAID ELLIS AND THE EXECUTORS OF SAID COHEN, DECEASED, ASSIGNORS, BY MESNE ASSIGNMENTS, TO SETH B. HUNT, TRUSTEE, OF MOUNT KISCO, NEW YORK.

PRODUCTION OF ACID EXTRACT AND ALCOHOLS FROM HYDROCARBON GASES.

No Drawing. Original application filed March 20, 1917, Serial No. 156,197. Divided and this application filed April 19, 1920. Serial No. 375,083.

*To all whom it may concern:*

Be it known that we, CARLETON ELLIS and MORTIMER J. COHEN, citizens of the United States, and residents of Montclair, county of Essex, and State of New Jersey, and New York, county of New York, and State of New York, respectively, have made a certain new and useful Invention Relating to the Production of Acid Extract and Alcohols from Hydrocarbon Gases, of which the following is a specification.

This application is a division of our application Ser. No. 156,197, filed March 20, 1917, which said application was a continuation in part of our application having original Ser. No. 23,084, filed Apr. 22, 1915. The claims of the present application are specific to the treatment of and derivatives from gaseous hydrocarbons, whereas our copending application Ser. No. 230,679, filed Apr. 25, 1918, which likewise was derived from application No. 23,084 contains claims generic to the treatment of and derivatives from hydrocarbons, including both gaseous and liquid hydrocarbons.

The invention relates to the treatment of gaseous hydrocarbons such as still gases of petroleum for the conversion of the unsaturated components thereof into their sulfated derivations, and mixtures of the alcohols corresponding to the olefines of such gases.

The gases derived, for example, from oil stills in distillation, cracking operations, etc., which have been heretofore wasted or at the best simply used for fuel purposes, may be passed into sulfuric acid to form sulfated products of lower molecular weight than is ordinarily obtained from unsaturated gasolene fractions, and these may likewise be converted into the various products similar to those obtained from liquid gasolene fractions, except that the larger proportion thereof have fewer carbon atoms. At the same time a certain amount of polymerization progresses, depending on conditions, producing in some cases oils having an average boiling point of, say, 200° C.–400° C. or even higher, corresponding to kerosene, lubricating oils and the like. In large scale operations in connection with the present invention various scrubbing and washing devices may be used for contacting the sulfuric acid with the unsaturated hydrocarbons in gaseous form, for instance, the materials may be allowed to contact with sulfuric acid in an absorption tower which, if desired, may be arranged so that the acid trickles down over the mass of porous material, such as coke or refractory bodies, while the gaseous unsaturated material passes upwardly through the tower, and thus the most nearly saturated acid comes in contact with the fresh material, thereby establishing a counter-current system which secures an effective absorption. The temperature of the tower should be regulated with respect to the strength of the acid and other conditions so as to secure the least amount of undesirable tar formation, polymerization, etc.

By such treatment whereby the gases and vapors are passed through sulfuric or equivalent acid or contracted therewith, care being taken to restrict the reaction to avoid undesirable production of sulfonated and tarry material, substantial quantities of mixtures of alkyl hydrogen sulfates are obtained corresponding to the olefines of the gases treated, and the same may be subjected to hydrolysis with water or equivalent hydrolyzing agent, whereby mixtures of alcohols corresponding to the olefines of such gases may be obtained, and either by esterification of such mixtures of alcohols or by direct acetylation of the mixtures of alkyl hydrogen sulfates, mixtures of the esters corresponding to the olefines of such gases may be obtained.

The olefines of cracked hydrocarbons, such as petroleum still gases, are readily absorbed by sulfuric acid which, unless care is taken to prevent it, reacts to cause polymerization. According to the present invention polymerization is avoided and products containing oxygen, for example, the sulfated derivatives of olefines, are produced from the unsaturated materials. By the term "under sulfating conditions" as used herein we mean conditions whereby the reaction of sulfuric acid upon the olefine material is substantially confined to sulfation, and whereby the formation of tarry and resinous sulfonated materials and similar products and sludges is avoided, as is also the undesirable polymerization of the materials under treatment.

The time effect of sulfuric acid treatment is an important one because polymerization phenomena depend, among other things, upon the amount of exposure of the gases to sulfuric acid. The temperature must also be regulated with care, as too high a temperature causes sulfonation and oxidation with the formation of sulfur dioxide and much tarry material and undesirable polymerizing action. The temperature in the absorption or scrubbing tower, or the like, may advantageously be kept down, as by the use of refrigerating coils or equivalent temperature lowering means, which withdraw the heat of reaction and keep the temperature of the reaction mixture from rising substantially, so that the treatment is carried out under sulfating conditions. Also, the gases may advantageously be cooled before they are admitted into the sulfating apparatus, such as an absorption or scrubbing tower or the like. The strength of acid should be regulated so as to avoid sulfonation and undesirable polymerization, the gases being preferably subjected, as in the absorption tower and the like, first to the action of diluted or partially combined acid, and later to the action of stronger acid. After the sulfated material has been formed it may be immediately mixed with water so as to check any action of sulfonation and undesirable polymerization, and upon reaction with water or other hydrolyzing material the alcohols are produced or liberated while at the same time the sulfuric acid is set free. The alcohols may be removed from the dilute acid or may be separated therefrom by distillation with steam or both and may be subsequently rectified, if desired.

The alcohols produced may be used as they are, or they may be treated with acetic acid or other esterifying materials to form esters (which may be used as solvents in the manufacture of gun cotton, celluloid or the like) either going through the hydrolysis operation separately, or various esters may be obtained directly by treating the sulfated olefine mixtures with esterifying material; for example, by treating the same with glacial acetic acid especially in the presence of a small quantity of free sulfuric acid and distilled, giving the acetic ester mixture. In some cases the sulfuric acid appears to extract or dissolve the olefine hydrocarbons from the gases without reacting completely with these, and on dilution with water separation of some unchanged or partially changed hydrocarbon occurs. In such cases the olefines may be collected and retreated.

The saturated gaseous components remaining after the absorption of the unsaturated components may be withdrawn in any suitable way, as by conducting them away from the top of the sulfating apparatus and may be utilized for fuel or for other purposes to which they are adapted.

In the production of alcohols from the olefines contained in gases, such as produced in the distillation and cracking of petroleum oils, by means of passing these gases through sulfuric acid, various factors come into play, such as the strength of acid, temperature of acid and the constitution of the gases being acted upon. By the constitution of the gases is meant the proportional amounts of gaseous olefines, which may be present in these gases, and also any vapors of bodies which may not have been condensed. Also under this heading may be considered the structure of the olefines contained in the gas, whether iso olefines or normal olefines.

Where in the following examples, which are given for the purpose of illustration, the acid is diluted, water is used as the diluting agent.

Gases produced by cracking kerosene oil in a tube cracking apparatus were passed through sulfuric acid of varying strengths in an apparatus affording large contact surface. Samples of the gas were taken before and after passage through this absorption apparatus and examined to determine their olefine content, the difference in olefine content before and after passing through the absorption apparatus showing the extent to which the unsaturated materials were absorbed.

15 pounds of kerosene were cracked by passing it at a high temperature through a tube cracking apparatus. The resulting gases, together with the light liquids formed, were passed through a water condenser, thus condensing the light liquid fractions which amounted in all to about 9 pounds. The non-condensable gases and vapors, which on analysis with fuming sulfuric acid showed about 40% unsaturated material were passed through 1.75 sulfuric acid. No appreciable heating was noticeable and practically no oils separated out on permitting the acid extract to stand, but the yield of mixtures of alcohols obtained upon dilution and distillation were relatively great and corresponded substantially to the entire absorbed olefine content removed from the gases by the acid.

With 1.70 sulfuric acid, the apparatus being substantially cold, the absorption of the unsaturated gases as shown by gas analysis was so small that it could scarcely be measured. Lubricating oils and similar polymers produced were practically absent, and upon dilution and distillation small quantities of alcohols were obtained, indicating that whatever absorption had taken place was substantially entirely productive of alcohols.

With 1.54 sulfuric acid there was practically no absorption and no production of polymers, as lubricating oils, and only slight traces of the alcohols.

With sulfuric acid of 1.84 specific gravity principally oily products were obtained, and the yield of alcohols was low. It follows from the foregoing that to produce alcohols rather than polymerized products, the acid should be of strength below the ordinary commercial 66° Bé. acid of about 1.84 specific gravity. Where in our specification and claims we refer to sulfuric acid of 1.84 specific gravity we use this expression as a convenient designation for ordinary commercial concentrated acid commonly described as 66° Baumé acid.

The absorption of gases can be more effectively carried out by provision of a number of the towers or other absorption apparatus, and the strengths of acid used in the different towers or other apparatus may be varied according to the results desired to be produced, and also the counter current effect already referred to, where absorption towers are used, may be applied in the successive towers in a series. It may be so arranged that the gases may be reacted upon in successive acid washing towers in which increasing strengths of acid are flowing. In other words, the gases may first be passed through a tower or towers containing the weaker acids, in which tower those olefines which are undesirably reacted upon by the stronger acids are extracted from the gas, and then passed through towers containing stronger acid, which will further react on unsaturated hydrocarbons remaining in the gas, until the gas reaches the highest strength acid. For example, we may use different strengths of acid in a progressive manner so that the gases are first exposed to dilute sulfuric acid of a strength above acid of 1.54 specific gravity, then to stronger acid of strength below acid 1.84 specific gravity. The process is carried out so as to absorb olefines higher than ethylene, as the present process is directed to the production of higher monohydric, secondary alcohols: propyl, butyl, etc.

Having thus described our invention, we claim:

1. The process of making reactive acid liquor which consists in bringing a gaseous mixture of saturated and unsaturated hydrocarbons into intimate contact with sulfuric acid of a strength equivalent to that of sulfuric acid of specific gravity of about 1.75 while cooling, whereby there is produced a mixture of alkyl hydrogen sulfates corresponding to the propylene and higher olefines of said mixture.

2. The process of separating olefine material of over two carbon atoms, in reactive form, from a mixture of saturated and unsaturated gaseous hydrocarbons, which consists in treating such gases with sulfuric acid of reactive strength below that of acid of 1.84 specific gravity, while subjecting the reaction mixture to cooling to a temperature such that unsaturated hydrocarbons having less than three carbon atoms are not absorbed and which produces, in liquid form, sulfated derivatives of the olefines having three or more carbon atoms as a major proportion of the product of reaction of the sulfuric acid on such gases and avoids undue conversion of such olefines into tars and the like.

3. The process of separating olefine material of over two carbon atoms, in reactive form, from a mixture of saturated and unsaturated gaseous hydrocarbons, which consists in bringing such gases into intimate contact with sulfuric acid of reactive strength below that of acid of 1.84 specific gravity, and of a strength greater than that of acid of 1.54 specific gravity, while maintaining the temperature within limits at which fluid sulfated derivatives of unsaturated hydrocarbons are produced as a major portion of the product of reaction of the sulfuric acid on such gases, such temperature limits being sufficiently low to avoid extensive formation of tars and the like by acid of the strength used.

4. The process of separating olefine material of over two carbon atoms, in reactive form, from a mixture of saturated and unsaturated gaseous hydrocarbons, which consists in bringing such gases into intimate contact with sulfuric acid of reactive strength while keeping the temperature substantially below 40° C., the sulfuric acid used being of a strength adapted to react at such temperatures with such olefines to produce, in liquid form, sulfated derivatives of olefines higher than ethylene as a major proportion of the product of reaction of the sulfuric acid on such gases.

5. As a new article of manufacture, a product consisting of a mixture of monohydric alcohols derived from gaseous olefines of cracked petroleum, said gaseous olefines comprising propylene and olefines higher in the olefine series than propylene, said product comprising secondary alcohols and being free from ethyl alcohol.

6. A liquid reaction product of sulfuric acid and cracked hydrocarbon gases containing olefines, a major proportion of which consists of sulfated derivatives of olefines of over two carbon atoms, said derivatives being primarily derivatives of propylene and said product being free from sulfated derivatives of ethylene.

7. A liquid reaction product of sulfuric acid of reactive strength below that of acid of 1.84 specific gravity and cracked hydrocarbon gases containing olefines, a major proportion whereof consists of sulfated derivatives of olefines of over two carbon atoms, said derivatives being primarily derivatives of propylene, and said product being free from sulfated derivatives of ethylene.

8. A liquid reaction product of sulfuric acid and cracked hydrocarbon gases containing olefines, a major proportion whereof consists of sulfated derivatives of olefines of over two carbon atoms, said derivatives being primarily derivatives of propylene, which product also comprises a minor proportion of oily polymers and is free from derivatives of ethylene.

9. A reactive acid liquor resulting from the reaction of sulfuric acid on cracked hydrocarbon gases containing olefines and saturated hydrocarbons, which as separated by gravity separation from associated immiscible material contains sulfated derivatives of said olefines in proportions to yield, upon hydrolysis, a quantity of alcohols having more than two carbon atoms and comprising primarily isopropyl alcohol, which quantity is in excess of 20% by volume of the amount of such reactive acid liquor.

In witness whereof we have signed our names hereto.

CARLETON ELLIS.
MORTIMER J. COHEN.